July 27, 1926.

J. H. STROUSE

AUTOMOBILE SIGNAL

Filed Nov. 8, 1924

J. H. Strouse
INVENTOR

BY Victor J. Evans
ATTORNEY

WITNESS:

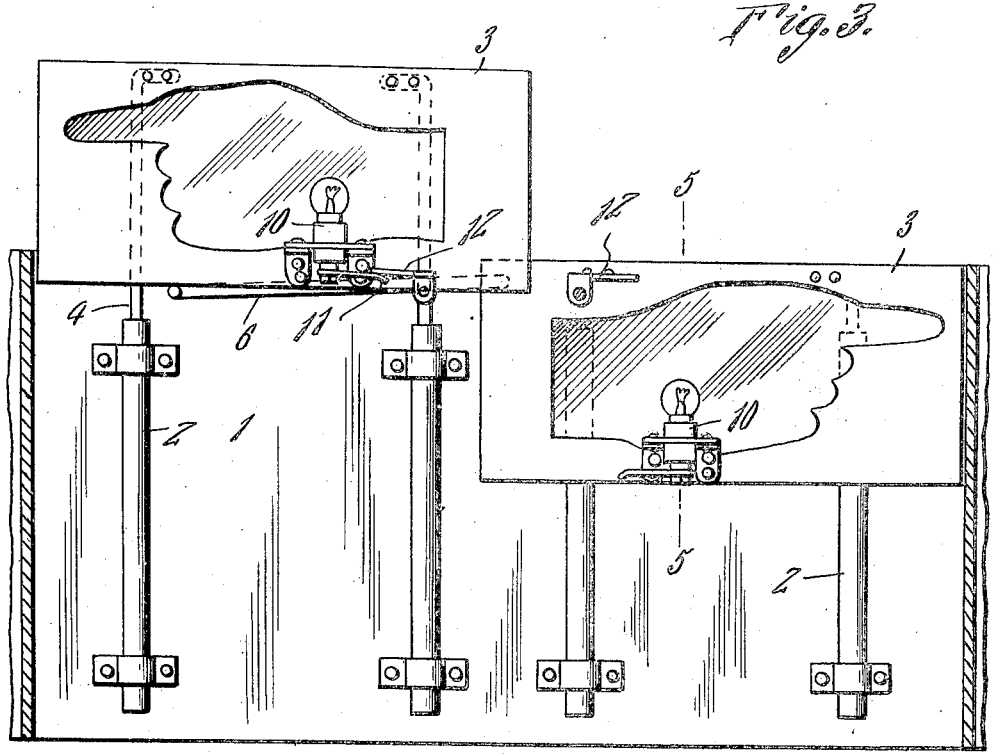
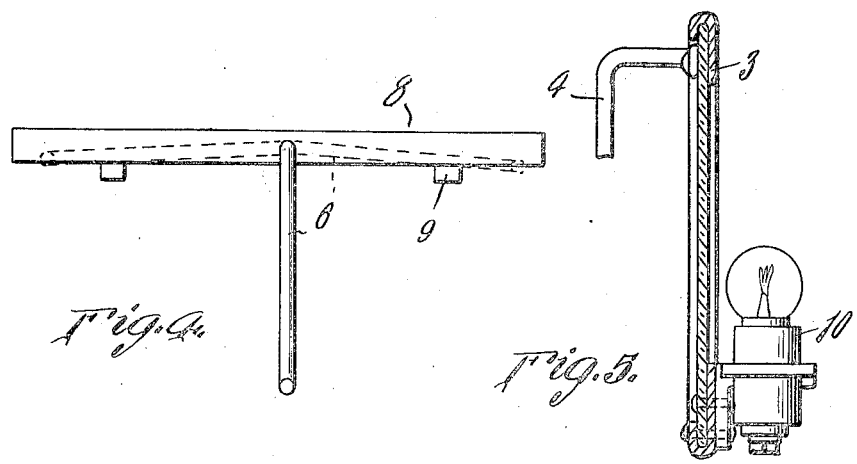

Patented July 27, 1926.

1,594,281

UNITED STATES PATENT OFFICE.

JAMES H. STROUSE, OF ELMIRA, NEW YORK.

AUTOMOBILE SIGNAL.

Application filed November 8, 1924. Serial No. 748,650.

This invention relates to a directional signal for automobiles and other motor vehicles, the general object of the invention being to provide a pair of signals at the top of the vehicle with a casing in which the signals normally rest with means whereby the driver or operator can raise a signal out of the casing to a point where it can be seen by the drivers of other vehicles and by pedestrians.

Another object of the invention is to provide means whereby a circuit to a lamp on the signal is closed when the signal is in raised position so as to illuminate the same.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 3 is an enlarged longitudinal sectional view through the signal and showing the switch parts 12 which are fastened to the casing.

Figure 4 is a view of the operating means for the signals.

Figure 5 is a section on line 5—5 of Figure 3.

Figure 1:
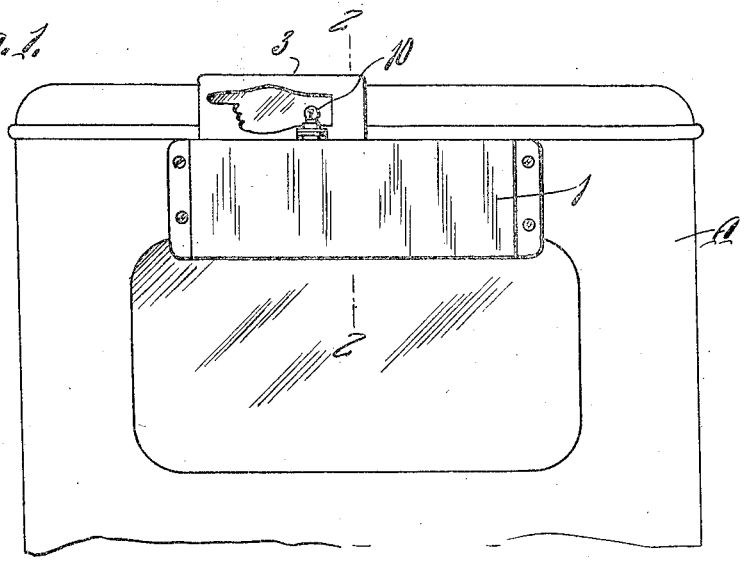
Figure 1 is a rear view of a portion of an automobile showing the invention in use.
Figure 2:
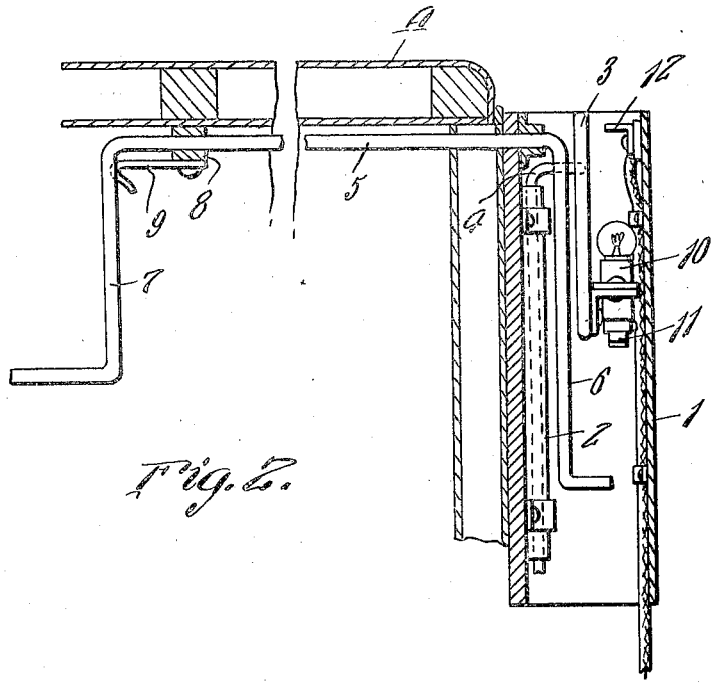
Figure 2 is a section on line 2—2 of Figure 1.

In these views, 1 indicates a casing which is adapted to be fastened to the rear of an automobile or other motor vehicle, such as shown at A, at the top thereof. It is of course understood, however, that the signal may be placed in any other suitable position. Two pairs of guiding tubes 2 are vertically arranged in said casing and a pair of signal plates 3 are each provided with rods 4 which engage the tubes so that the plates are slidably mounted in the casing and can be projected to a position where they can be seen above the top of the casing. Such projecting means comprises a rod 5 rotatably supported in the top of the vehicle and extending into the casing where it is provided with a cranked end 6 which is adapted to engage the bottom of either signal plate according to the direction of movement of the rod. The front end of the rod is also cranked, as at 7, to form a handle whereby the operator of the vehicle can rock the rod. A strip 8 is placed in the top of the vehicle and has a hole therein through which the rod passes and it also has a pair of spring clips 9 thereon for holding the end 7 of the rod in either one of its raised positions. I prefer to make each signal plate with a transparent portion having a hand with one finger pointing thereon, as shown in Figures 1 and 3. The hands point in opposite directions and one signal indicates that the vehicle is to be turned to the right and the other that it is to be turned to the left. An electric lamp 10 is carried by each signal plate and has a switch part 11 thereon which will engage a switch part 12 on the casing when the signal plate is in fully raised position so as to complete the circuit to the lamp and thus light the same so as to illuminate the signal when the same is raised. As soon as the signal plate starts to descend the switch parts separate and thus break the circuit.

From the foregoing it will be seen that when the driver is to make a turn, he will grasp the handle 7 and push it upwardly in the proper direction so as to rock the rod 5 and cause its cranked end 6 to engage a signal plate and thus force it upwardly so that it will appear at the top of the casing. As the plate reaches its upper position the switch parts will come together to complete the circuit of the lamp so that the same will be lighted and illuminate the signal. Thus the signal can be seen during the day as well as at night. After the turn has been made the operator pulls the handle 7 downwardly so that the signal will drop back into the casing and thus be hidden from view.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An automobile signal including a housing, spaced guide tubes arranged in pairs and attached to one wall of the housing, supporting rods arranged in pairs and movable within the guide tubes, signal plates carried by each pair of rods, an actuating rod pivotally mounted in the wall of the casing to which the guide tubes are attached and arranged between each pair of tubes, a crank arm on the inner end of said rod adapted to be moved for engagement with either one of said signal plates whereby to raise them independently above the wall of the housing upon actuation of said rod.

In testimony whereof I affix my signature.

JAMES H. STROUSE.